United States Patent
Tei et al.

(10) Patent No.: US 10,777,805 B2
(45) Date of Patent: Sep. 15, 2020

(54) NEGATIVE ELECTRODE ACTIVE MATERIAL CONTAINING GRAPHITE MATERIAL AND BATTERY INCLUDING NEGATIVE ELECTRODE CONTAINING NEGATIVE ELECTRODE ACTIVE MATERIAL

(71) Applicant: Panasonic Intellectual Property Management Co., Ltd., Osaka (JP)

(72) Inventors: Go Tei, Osaka (JP); Ryohei Miyamae, Osaka (JP); Akira Kano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 15/869,047

(22) Filed: Jan. 12, 2018

(65) Prior Publication Data
US 2018/0287137 A1    Oct. 4, 2018

(30) Foreign Application Priority Data

Mar. 28, 2017  (JP) .................................. 2017-063007

(51) Int. Cl.
| H01M 4/133 | (2010.01) |
| H01M 4/38 | (2006.01) |
| H01M 10/052 | (2010.01) |
| H01M 4/02 | (2006.01) |
| H01M 10/0525 | (2010.01) |

(52) U.S. Cl.
CPC ............ *H01M 4/133* (2013.01); *H01M 4/38* (2013.01); *H01M 4/381* (2013.01); *H01M 10/052* (2013.01); *H01M 10/0525* (2013.01); *H01M 2004/027* (2013.01); *Y02E 60/122* (2013.01); *Y02T 10/7011* (2013.01)

(58) Field of Classification Search
CPC ........ H01M 4/133; H01M 4/381; H01M 4/38; H01M 10/052; H01M 10/0525; H01M 2004/027; Y02E 60/122; Y02T 10/7011
See application file for complete search history.

(56) References Cited

U.S. PATENT DOCUMENTS

| 5,498,493 A | 3/1996 | Dahn et al. |
| 5,753,387 A | 5/1998 | Takami et al. |

FOREIGN PATENT DOCUMENTS

| JP | 7-073898 | 3/1995 |
| JP | 9-213335 | 8/1997 |
| JP | 10-289718 | 10/1998 |
| JP | 2002-110160 | * 4/2002 |

* cited by examiner

*Primary Examiner* — Laura Weiner
(74) *Attorney, Agent, or Firm* — McDermott Will & Emery LLP (57) ABSTRACT

A negative electrode active material contains a graphite material represented by a formula $Ca_xB_yC_{1-y}$, where x and y satisfy $0<x<0.2$ and $2x\le y\le 0.5$.

4 Claims, 2 Drawing Sheets

NEGATIVE ELECTRODE ACTIVE MATERIAL CONTAINING GRAPHITE MATERIAL AND BATTERY INCLUDING NEGATIVE ELECTRODE CONTAINING NEGATIVE ELECTRODE ACTIVE MATERIAL

BACKGROUND

1. Technical Field

The present disclosure relates to a negative electrode active material and a battery including a negative electrode containing the negative electrode active material.

2. Description of the Related Art

In recent years, nonaqueous electrolyte secondary batteries have been actually used as electricity storage devices with high energy density. For example, lithium secondary batteries are attracting attention not only as power supplies for mobile devices but also as storage batteries for applications such as hybrid vehicles, electric vehicles, and home electricity storage systems and are being developed.

For example, a carbon material or the like capable of storing and releasing lithium ions can be used as a negative electrode active material for use in negative electrode of a lithium secondary batteries. It is known that using a material obtained by adding boron to such a carbon material capable of storing and releasing lithium ions as a negative electrode active material enables the capacity of a negative electrode to be increased. For example, Japanese Unexamined Patent Application Publication No. 2002-110160 discloses a negative electrode active material, capable of increasing the discharge capacity, for lithium secondary batteries, the negative electrode active material being represented by the formula $A_xB_yC_{1-y}$, where A represents a metal element, x satisfies the inequality $0.2 \leq x \leq 1$, and y satisfies the inequality $0.2 \leq y \leq 0.5$.

SUMMARY

In one general aspect, the techniques disclosed here feature a negative electrode active material containing a graphite material represented by a formula $Ca_xB_yC_{1-y}$, where x and y satisfy $0<x<0.2$ and $2x \leq y \leq 0.5$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The background of how a negative electrode active material according to the present disclosure was obtained is described below.

In current lithium secondary batteries, graphite is widely used as a negative electrode active material. However, the rapid spread of electric vehicles (EVs) powered by lithium secondary batteries and therefore demands for increasing the cruising distance of the EVs require the development of a negative electrode active material capable of further increasing the capacity of lithium secondary batteries.

As described in the paragraphs entitled "Description of the Related Art", Japanese Unexamined Patent Application Publication No. 2002-110160 discloses the negative electrode active material for lithium secondary batteries, the negative electrode active material being represented by the formula $A_xB_yC_{1-y}$, where A represents a metal element, x satisfies the inequality $0.2 \leq x \leq 1$, and y satisfies the inequality $0.2 \leq y \leq 0.5$. The negative electrode active material can increase the discharge capacity of lithium secondary batteries. The inventors have investigated this disclosed technique in detail and, as a result, have found that in the negative electrode active material, the charge/discharge voltage widely ranges from 0 V to 3 V versus a lithium reference electrode. From the viewpoint of practical use, an increase in capacity is required in a voltage range from 0 V to 2 V, which is generally used.

As a result of intensive investigations, the inventors have obtained the negative electrode active material according to the present disclosure on the basis of the above viewpoint. In particular, the inventors have focused on a graphite material containing boron and calcium and have investigated the relationship between the solid-solution ratio of each of boron and calcium to carbon and the discharge capacity of a battery. As a result of this investigation, the inventors have found the solid-solution ratio between boron and calcium such that a battery with high discharge capacity in a voltage range from 0 V to 2 V can be achieved, thereby reaching the negative electrode active material according to the present disclosure.

Overview of Aspect of the Present Disclosure

A negative electrode active material according to a first aspect of the present disclosure contains a graphite material represented by the formula $Ca_xB_yC_{1-y}$, where x and y satisfy the inequalities $0<x<0.2$ and $2x \leq y \leq 0.5$.

In accordance with the negative electrode active material according to the first aspect, a battery with increased discharge capacity can be achieved. The mechanism is inferred as described below. Herein, the case where the negative electrode active material is used in a lithium secondary battery is described as an example.

Graphite stores lithium ions between layers thereof. Since the saturation composition of an intercalation compound of graphite with lithium is $LiC_6$, graphite stores up to one lithium atom per six carbon atoms.

The graphite compound MBC, where M represents a metal element, B represents boron, and C represents carbon, can store a larger number of cations between layers thereof. In particular, substituting some of carbon atoms in a graphite crystal with boron atoms reduces the electron density of graphite and enables a larger number of cations to be held between layers of graphite. The graphite compound MBC can be synthesized by heat-treating, for example, a mixture of graphite, a metal element, and a boride. For example, in $Mg_{0.25}B_{0.5}C_{0.5}$ and $Ca_{0.25}B_{0.5}C_{0.5}$, half of carbon atoms are substituted with boron atoms and 1.5 atoms of the metal element per six atoms (carbon or boron atoms) making up each layer are present between the layers. In the case where a negative electrode containing such a graphite material is charged and discharged in a lithium electrolyte solution, cations can be held in some of sites between the graphite layers such that graphite is capable of being stably present and lithium ions can be stored in and released from the remainder sites.

In order to increase the discharge capacity of a negative electrode active material, in a graphite compound, it is required to appropriately control the type of a cation and the solid-solution ratio of each of boron and the cation to carbon. In accordance with the graphite material contained in the negative electrode active material according to the first aspect, the number of stored cations (that is, calcium ions) can be sufficiently increased and cation sites capable of contributing to charge and discharge can be sufficiently ensured. Thus, in accordance with the negative electrode active material according to the first aspect, a battery with increased discharge capacity in a voltage range from, for example, 0 V to 2 V can be achieved.

In a second aspect, in the formula representing the negative electrode active material according to the first aspect, x and y may satisfy, for example, the inequality $2x \leq y \leq 0.36$.

In accordance with the negative electrode active material according to the second aspect, a battery with increased discharge capacity can be achieved.

In a third aspect, in the formula representing the negative electrode active material according to the first or second aspect, x may satisfy, for example, the inequality $0.001 \leq x \leq 0.084$.

In accordance with the negative electrode active material according to the third aspect, a battery with increased discharge capacity can be achieved.

In a fourth aspect, in the formula representing the negative electrode active material according to the third aspect, x and y may satisfy, for example, the inequality $2x \leq y \leq 0.23$.

In accordance with the negative electrode active material according to the fourth aspect, a battery with increased discharge capacity can be achieved.

A battery according to a fifth aspect of the present disclosure includes a negative electrode containing the negative electrode active material according to any one of the first to fourth aspects, a positive electrode, and an electrolyte.

Since the battery according to the fifth aspect includes the negative electrode containing the negative electrode active material according to any one of the first to fourth aspects, high discharge capacity can be achieved.

EMBODIMENTS OF THE PRESENT DISCLOSURE

Embodiments of the present disclosure are described below in detail. The embodiments are for exemplification. The present disclosure is not limited to the embodiments.

First Embodiment

A first embodiment of the present disclosure describes a negative electrode active material.

The negative electrode active material contains a graphite material represented by the formula $Ca_xB_yC_{1-y}$, where x and y satisfy the inequalities $0<x<0.2$ and $2x \leq y \leq 0.5$. In the formula $Ca_xB_yC_{1-y}$, x and y may satisfy the inequality $2x \leq y \leq 0.36$. In the formula $Ca_xB_yC_{1-y}$, x may satisfy the inequality $0.001 \leq x \leq 0.084$ and x and y may satisfy the inequality $2x \leq y \leq 0.23$.

In order to add one calcium atom, which can be converted into a divalent cation, the electron density of graphite needs to be reduced by two electrons by substituting at least two carbon atoms with two boron atoms. The inequality $2x \leq y$ shows this numerical relation.

The graphite material contains boron and calcium. The graphite material may have a structure in which some of carbon atoms in a graphite crystal are substituted with boron atoms and in which calcium atoms are located between layers of graphite.

Figure 1:
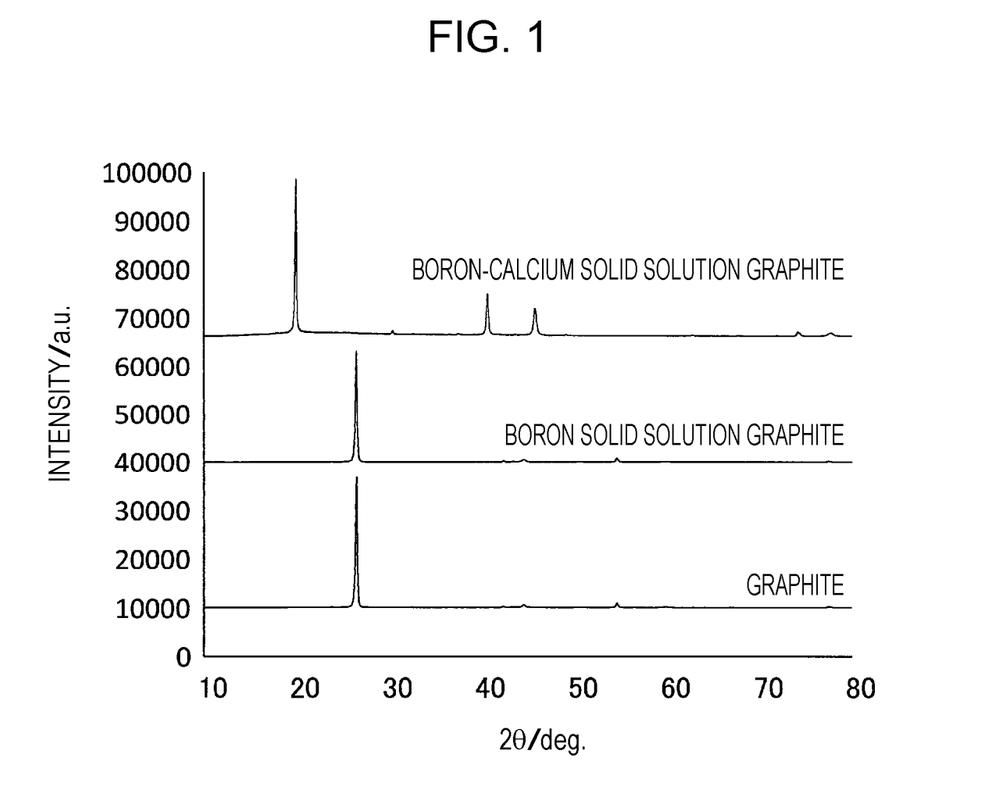
FIG. 1 is a graph showing an example of an X-ray diffraction pattern of a graphite compound contained in a negative electrode active material according to a first embodiment of the present disclosure and X-ray diffraction patterns of other graphite materials.

The structure of the graphite compound can be confirmed by, for example, X-ray diffraction (XRD) measurement. FIG. 1 shows an XRD pattern of the graphite compound that contains boron and calcium as solute atoms in solid solution, an XRD pattern of calcium-free graphite compound for comparison that contains only boron as solute atoms in solid solution, and an XRD pattern of graphite for comparison. As shown in FIG. 1, the graphite compound exhibits a specific XRD pattern different from that of the calcium-free graphite compound and that of graphite. In an example shown in FIG. 1, the position of a peak in the XRD pattern of the graphite compound is shifted to a lower angle as compared to that of the calcium-free graphite compound and that of graphite. This shows that the distance between layers of graphite partially substituted with boron is increased by calcium present therebetween. The shift of the peak position may vary depending on the composition of the graphite compound and therefore is not limited to the example shown in FIG. 1.

Figure 2:
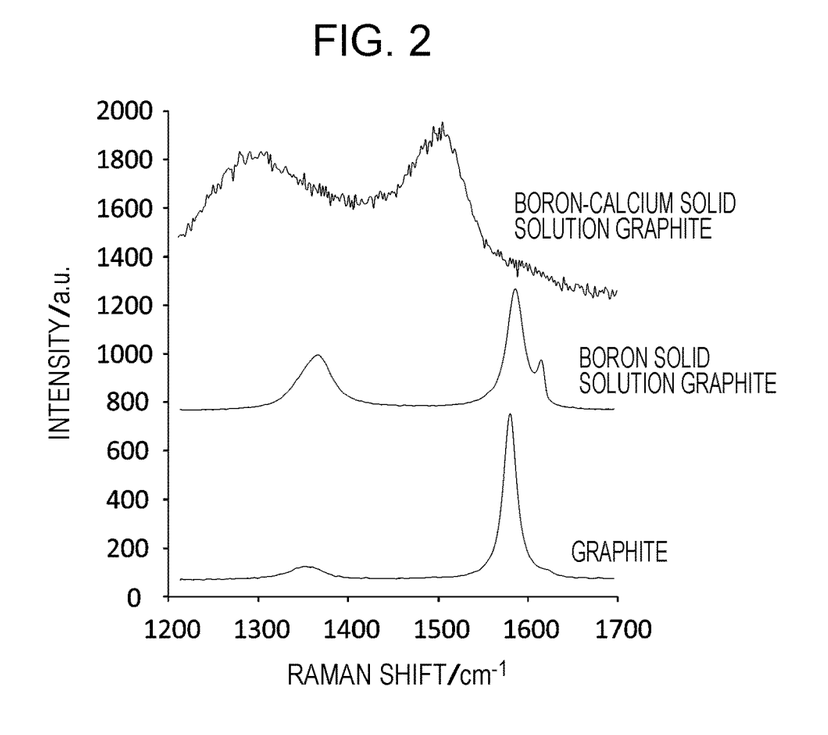
FIG. 2 is a graph showing a Raman spectrum of the graphite compound contained in the negative electrode active material according to the first embodiment and Raman spectra of other graphite materials.

When the concentration of calcium in the graphite compound is low, even the graphite compound may not exhibit the above specific XRD pattern. In this case, the structure of the graphite compound can be estimated from, for example, results of Raman measurement. FIG. 2 shows a Raman spectrum of the graphite compound that contains boron and calcium as solute atoms, a Raman spectrum of calcium-free graphite compound for comparison that contains only boron as solute atoms, and a Raman spectrum of graphite for comparison. As shown in FIG. 2, the graphite compound exhibits a specific spectrum different from that of the calcium-free graphite compound and that of graphite. In an example shown in FIG. 2, the Raman shift of the G-band peak in the Raman spectrum of the graphite compound is smaller than that of the calcium-free graphite compound and that of graphite. In the case where such a difference is observed, the presence of calcium between layers of graphite partially substituted with boron can be inferred from the Raman spectra. The Raman shift may vary depending on the particular composition of the graphite compound and therefore is not limited to the example shown in FIG. 2.

The ratio between calcium, boron, and carbon in the graphite material can be checked by, for example, inductively coupled plasma (ICP) emission spectrometry.

The graphite material has the composition represented by the above formula and therefore can increase the discharge capacity. Thus, according to the negative electrode active material, which contains the graphite material, a battery with increased discharge capacity can be achieved.

The negative electrode active material may contain another material in addition to the graphite material. In order to obtain a high effect due to an increase in discharge capacity, the negative electrode active material may contain 50% by mass or more of the graphite material or may be made of the graphite material only.

A method for producing the graphite material, which has the composition represented by the above formula, is described below.

The graphite material can be produced in such a manner that, for example, a boron source and a calcium source are added to a material (for example, graphite, an organic material, or an amorphous carbon material) serving as a carbon source, followed by mixing and calcination in an inert atmosphere.

When a carbon source used is graphite, boron and calcium form solid solutions in graphite together. When the carbon source used is the organic material or the amorphous carbon material, boron and calcium form solid solutions together with the graphitization of the carbon source.

The organic material, which serves as the carbon source, may be a synthetic resin such as polyvinyl alcohol. The synthetic resin may be sheet-shaped, fibrous, or granular. In consideration of processing after calcination, the organic material, which serves as the carbon source, may be a granular or micro-fibrous synthetic resin with a size of several micrometers to tens of micrometers. In the case of using the carbon source used for the organic material, the heat treatment temperature thereof may be 1,000° C. to 2,000° C. For example, inert gases such as nitrogen, argon, helium, and neon can be used in a calcination atmosphere. From the viewpoint of cost, an inert gas used may be nitrogen. Heat treatment up to about 1,000° C. allows elements other than carbon to evaporate from a raw material used as the carbon source, so that the carbonization of the raw material proceeds. Heat treatment at 1,000° C. to 2,000° C. allows the graphitization of carbon to proceed. Together with this, the boron source and the calcium source react with the carbon source, so that boron forms a solid solution in a graphite crystal and calcium forms a solid solution between the graphite layers.

The amorphous carbon material, which serves as the carbon source, may be soft carbon including petroleum coke and coal coke. Soft carbon may be sheet-shaped, fibrous, or granular. In consideration of processing after calcination, the amorphous carbon material, which serves as the carbon source, may be a granular or micro-fibrous synthetic resin with a size of several micrometers to tens of micrometers. In the case of using the amorphous carbon material for the carbon source, the heat treatment temperature thereof may be 1,000° C. to 2,000° C. For example, inert gases such as nitrogen, argon, helium, and neon can be used in a calcination atmosphere. Heat treatment allows the graphitization of carbon to proceed. Together with this, the boron source and the calcium source react with the carbon source, so that boron forms a solid solution in the graphite crystal and calcium forms a solid solution between the graphite layers.

The boron source may be at least one selected from the group consisting of boron, boric acid, calcium boride, and diborides such as aluminium diboride and magnesium diboride.

The calcium source may be at least one selected from the group consisting of metallic calcium, calcium hydride, calcium hydroxide, calcium carbide, and calcium carbonate.

The ratio between elements in a product can be adjusted by appropriately selecting, for example, the type of the carbon source, the type of the boron source, the type of the calcium source, the mixing ratio of the carbon source to the boron source to the calcium source, heat treatment conditions, and/or conditions for retreatment (for example, pickling and/or second heat treatment) after heat treatment.

As described above, the method for producing the graphite material includes a step of obtaining a mixture by mixing the carbon source, the boron source, and the calcium source and a step of heat-treating the mixture in an inert atmosphere.

Second Embodiment

A second embodiment of the present disclosure describes a battery. Descriptions overlapping with the first embodiment are appropriately omitted.

The battery according to this embodiment includes a negative electrode, a positive electrode, and an electrolyte. The negative electrode contains the negative electrode active material according to the first embodiment.

According to the above configuration, a battery with high discharge capacity density can be achieved.

Figure 3:
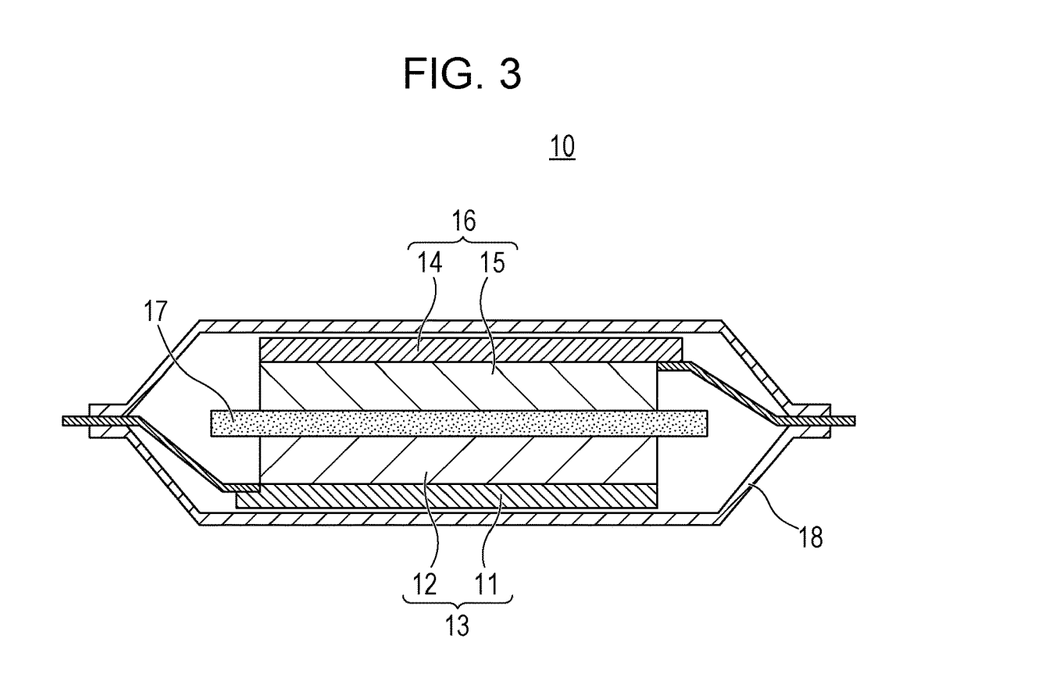
FIG. 3 is a sectional view showing the schematic configuration of a battery that is an example of a battery according to a second embodiment of the present disclosure.

FIG. 3 is a sectional view showing the schematic configuration of a battery 10 that is an example of the battery according to this embodiment. Herein, descriptions are made using a lithium secondary battery as an example.

As shown in FIG. 3, the battery 10 includes a negative electrode 13, a positive electrode 16, a separator 17, and an enclosure 18.

The negative electrode 13 is composed of a negative electrode current collector 11 and a negative electrode mix layer 12 which is placed on the negative electrode current collector 11 and which is in contact with the negative electrode current collector 11.

The positive electrode 16 is composed of a positive electrode current collector 14 and a positive electrode mix layer 15 which is placed on the positive electrode current collector 14 and which is in contact with the positive electrode current collector 14.

The negative electrode 13 and the positive electrode 16 are placed opposite to each other with the separator 17 therebetween.

The enclosure 18 covers the negative electrode 13, the positive electrode 16, and the separator 17.

The negative electrode 13 contains the negative electrode active material according to the first embodiment. In particular, the negative electrode mix layer 12 contains the negative electrode active material according to the first embodiment. The negative electrode mix layer 12 may contain another negative electrode active material capable of storing and releasing lithium ions, a conductive aid, an ion conductor, a binder and/or the like as required.

The conductive aid and the ion conductor are used to reduce the electrode resistance. Examples of the conductive aid include carbon materials (carbon conductive aids) such as carbon black, graphite, acetylene black, carbon nanotubes, carbon nanofibers, graphene, fullerene, and graphite oxide and conductive polymeric compounds such as polyaniline, polypyrrole, and polythiophene. Examples of the ion conductor include gelled electrolytes such as polymethyl methacrylate, organic solid electrolytes such as polyethylene oxide, and inorganic solid electrolytes such $Li_7La_3Zr_2O_{12}$.

The binder is used to enhance the adhesion between materials making up electrodes. Examples of the binder include polyvinylidene fluoride, vinylidene fluoride-hexafluoropropylene copolymers, vinylidene fluoride-tetrafluoroethylene copolymers, polytetrafluoroethylene, carboxymethylcellulose, polyacrylic acid, styrene-butadiene copolymer rubber, polypropylene, polyethylene, and polyimide.

The negative electrode current collector 11 used may be a porous or poreless sheet or film made of a metal material such as stainless steel, nickel, copper, or an alloy of nickel or copper. The sheet or film used may be metal foil, metal mesh, or the like. In order to reduce the resistance, in order to impart catalysis, and in order to strengthen the bond between the negative electrode mix layer 12 and the negative electrode current collector 11 by chemically or physically bonding the negative electrode mix layer 12 and the negative electrode current collector 11 together, a carbon material such as carbon may be applied to a surface of the negative electrode current collector 11 as a conductive aid material.

The positive electrode mix layer 15 contains a positive electrode active material capable of storing and releasing lithium ions. The positive electrode mix layer 15 may contain the same conductive aid, ion conductor, and/or binder as that may be contained in the negative electrode mix layer 12 as required.

The positive electrode active material used may be a material storing and releasing lithium ions. Examples of the positive electrode active material include lithium transition metal oxides, transition metal fluorides, polyanionic materials, fluorinated polyanionic materials, and transition metal sulfides. In particular, a lithium transition metal oxide is preferably used because production costs are low and the average discharge voltage is high.

The positive electrode current collector 14 used may be a porous or poreless sheet or film made of a metal material such as aluminium, stainless steel, titanium, or an alloy of aluminium or titanium. The metal material may be aluminium or an aluminium alloy because aluminium and the aluminium alloy are inexpensive and are readily formed into a thin film. Such a sheet or film used may be metal foil, metal mesh, or the like. In order to reduce the resistance, in order to impart catalysis, and in order to tighten the bond between the positive electrode mix layer 15 and the positive electrode current collector 14 by chemically or physically bonding the positive electrode mix layer 15 and the positive electrode current collector 14 together, a carbon material such as carbon may be applied to a surface of the positive electrode current collector 14 in the form of a conductive aid material.

The electrolyte may be a nonaqueous electrolyte. The electrolyte may be an electrolyte solution containing a lithium salt and nonaqueous solvent, a gelled electrolyte, a solid electrolyte, or the like.

Examples of the lithium salt include lithium hexafluorophosphate ($LiPF_6$), lithium tetrafluoroborate ($LiBF_4$), lithium perchlorate ($LiClO_4$), lithium bis(trifluoromethylsulfonyl)imide ($LiN(SO_2CF_3)_2$), lithium bis(perfluoroethylsulfonyl)imide ($LiN(SO_2C_2F_5)_2$), lithium bis(fluorosulfonyl)imide ($LiN(SO_2F)_2$), lithium hexafluoroarsenate ($LiAsF_6$), lithium trifluoromethanesulfonate ($LiCF_3SO_3$), and lithium difluoro(oxalato)borate. In particular, $LiPF_6$ is preferably used from the viewpoint of battery safety, thermal stability, and ionic conductivity. These electrolyte salts may be used alone or in combination.

The nonaqueous solvent used may be at least one selected from the group consisting of cyclic carbonates, linear carbonates, esters, cyclic ethers, linear ethers, nitriles, and amides. These solvents may be used alone or in combination.

Examples of the cyclic carbonates include ethylene carbonate, propylene carbonate, and butylene carbonate. Those obtained by substituting some or all of hydrogen atoms in these carbonates with fluorine atoms can be used. For example, trifluoropropylene carbonate and fluoroethyl carbonate are cited.

Examples of the linear carbonates include dimethyl carbonate, ethyl methyl carbonate, diethyl carbonate, methyl propyl carbonate, ethyl propyl carbonate, and methyl isopropyl carbonate. Those obtained by substituting some or all of hydrogen atoms in these carbonates with fluorine atoms can be used.

Examples of the esters include methyl acetate, ethyl acetate, propyl acetate, methyl propionate, ethyl propionate, and γ-butyrolactone.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ethers.

Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile.

Examples of the amides include dimethylformamide.

The separator 17 is not particularly limited and may be one having the function of electrically separating the negative electrode 13 and the positive electrode 16 from each other. Examples of the separator 17 include porous insulating members such as porous films made of polyethylene (PE), polypropylene (PP), or the like; resin nonwoven fabrics made of PE, PP, or the like; glass fiber nonwoven fabrics; and paper nonwoven fabrics.

The enclosure 18 may be capable of covering the negative electrode 13, the positive electrode 16, and the separator 17 and therefore the shape and material of the enclosure 18 are not particularly limited. Thus, the enclosure 18 is not limited to one shown in FIG. 1. A known battery enclosure appropriately selected can be used.

EXAMPLES

Examples are described below. The examples are for exemplification. The present disclosure is not limited to the examples.

Example 1

Preparation of Graphite Material

To a graphite powder with an average particle size of 20 μm, 43.6% of calcium boride and 53.3% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,800° C. for 5 hours. Thereafter, heating was stopped and a graphite material was taken out of the calcination oven after natural cooling. The graphite material was ground in the agate mortar, whereby powder was obtained. In this way, the graphite material was prepared in Example 1.

Preparation of Negative Electrode

The graphite material prepared as described above, acetylene black serving as a conductive aid, and polyvinylidene fluoride serving as a binder were weighed so as to give a mass ratio of 7:2:1 and were mixed well in an agate mortar. The mixture was dispersed in N-methylpyrrolidone (NMP), whereby slurry was prepared. The prepared slurry was applied to a Cu current collector using a coater, followed by drying, whereby a negative electrode was prepared in Example 1.

Preparation of Test Electrode

The negative electrode prepared as described above was rolled with a roller and was punched into a 20 mm square piece. The piece was worked into an electrode shape, whereby a test electrode was prepared in Example 1.

Preparation of Evaluation Cell

A lithium secondary battery (evaluation cell) including a counter electrode and reference electrode made of metallic lithium was prepared using the above test electrode. The preparation of an electrolyte solution and the preparation of the evaluation cell were performed in a glove box with an Ar atmosphere having a dew point of −60° C. or lower and an oxygen concentration of 1 ppm or less.

The electrolyte solution used was one obtained by dissolving 1.4 molarity lithium hexafluorophosphate ($LiPF_6$) in a solvent obtained by mixing ethylene carbonate, ethyl methyl carbonate, and dimethyl carbonate at a volume ratio of 5:70:25.

Metallic lithium was pressure-bonded to a 20 mm square nickel mesh, whereby the counter electrode was prepared.

The above test electrode and the counter electrode were placed opposite to each other with a separator therebetween, the separator being composed of a polyethylene microporous membrane impregnated with the electrolyte solution. In this state, the test electrode, the counter electrode, and the separator were housed in an enclosure, followed by sealing the enclosure.

As described above, the evaluation cell was prepared in Example 1.

Example 2

Preparation of Graphite Material

To a graphite powder with an average particle size of 20 μm, 27.3% of calcium boride and 33.4% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 2,000° C. at a rate of 5° C. per minute and was held at 2,000° C. for 5 hours. Thereafter, heating was stopped and a graphite material was taken out of the calcination oven after natural cooling. The graphite material, which was obtained by calcination as described above, was ground in the agate mortar, whereby powder was obtained. In this way, the graphite material was prepared in Example 2.

Preparation of Negative Electrode

A negative electrode was prepared in Example 2 by the same method as that used in Example 1 except that the graphite material prepared in Example 2 was used.

Preparation of Test Electrode

A test electrode was prepared in Example 2 by the same method as that used in Example 1 except that the negative electrode prepared in Example 2 was used.

Preparation of Evaluation Cell

A evaluation cell was prepared in Example 2 by the same method as that used in Example 1 except that the test electrode prepared in Example 2 was used.

Example 3

Preparation of Graphite Material

To a graphite powder with an average particle size of 20 μm, 23.0% of calcium boride and 28.1% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 2,000° C. at a rate of 5° C. per minute and was held at 2,000° C. for 5 hours. Thereafter, heating was stopped and a graphite material was taken out of the calcination oven after natural cooling. The graphite material, which was obtained by calcination as described above, was ground in the agate mortar, whereby powder was obtained. In this way, the graphite material was prepared in Example 3.

Preparation of Negative Electrode

A negative electrode was prepared in Example 3 by the same method as that used in Example 1 except that the graphite material prepared in Example 3 was used.

Preparation of Test Electrode

A test electrode was prepared in Example 3 by the same method as that used in Example 1 except that the negative electrode prepared in Example 3 was used.

Preparation of Evaluation Cell

A evaluation cell was prepared in Example 3 by the same method as that used in Example 1 except that the test electrode prepared in Example 3 was used.

Example 4

Preparation of Graphite Material

To a graphite powder with an average particle size of 20 μm, 43.6% of calcium boride and 53.3% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,800° C. for 5 hours. Thereafter, heating was stopped and a graphite material was taken out of the calcination oven after natural cooling. The graphite material was ground in the agate mortar, whereby a powder of the graphite material was obtained. Furthermore, in the calcination oven (an Ar flow rate of 1 L/min) under the argon atmosphere, the graphite material powder was heated from room temperature to 2,000° C. at a rate of 5° C. per minute and was held at 2,000° C. for 5 hours. Thereafter, heating was stopped and the graphite material powder was taken out of the calcination oven after natural cooling. The graphite material powder was ground in the agate mortar, whereby a final powder of the graphite material was obtained. In this way, the graphite material was prepared in Example 4.

Preparation of Negative Electrode

A negative electrode was prepared in Example 4 by the same method as that used in Example 1 except that the graphite material prepared in Example 4 was used.

Preparation of Test Electrode

A test electrode was prepared in Example 4 by the same method as that used in Example 1 except that the negative electrode prepared in Example 4 was used.

Preparation of Evaluation Cell

A evaluation cell was prepared in Example 4 by the same method as that used in Example 1 except that the test electrode prepared in Example 4 was used.

Example 5

Preparation of Graphite Material

To a graphite powder with an average particle size of 20 μm, 43.6% of calcium boride and 53.3% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,800° C. for 5 hours. Thereafter, heating was stopped and a graphite material was taken out of the calcination oven after natural cooling. The graphite material was ground in the agate mortar, whereby a powder of the graphite material was obtained. The graphite material powder was washed with a 0.25 mol/L aqueous solution of hydrochloric acid and was then naturally dried. Subsequently, in the calcination oven (an Ar flow rate of 1 L/min) under the argon atmosphere, the graphite material powder was heated from room temperature to 1,800° C. at a rate of 5° C. per minute and was held at 1,800° C. for 5 hours again. Thereafter, heating was stopped and the graphite material powder was taken out of the calcination oven after natural cooling. The graphite material powder was ground in the agate mortar, whereby a final powder of the graphite material was obtained. In this way, the graphite material was prepared in Example 5.

Preparation of Negative Electrode

A negative electrode was prepared in Example 5 by the same method as that used in Example 1 except that the graphite material prepared in Example 5 was used.

Preparation of Test Electrode

A test electrode was prepared in Example 5 by the same method as that used in Example 1 except that the negative electrode prepared in Example 5 was used.

Preparation of Evaluation Cell

A evaluation cell was prepared in Example 5 by the same method as that used in Example 1 except that the test electrode prepared in Example 5 was used.

Example 6

Preparation of Graphite Material

To a graphite powder with an average particle size of 20 μm, 62.4% of calcium boride and 91.5% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,500° C. at a rate of 5° C. per minute and was held at 1,500° C. for 5 hours. Thereafter, heating was stopped and a graphite material was taken out of the calcination oven after natural cooling. The graphite material was ground in the agate mortar, whereby a powder of the graphite material was obtained. Furthermore, in the calcination oven (an Ar flow rate of 1 L/min) under the argon atmosphere, the graphite material powder was heated from room temperature to 2,000° C. at a rate of 5° C. per minute and was held at 2,000° C. for 5 hours. Thereafter, heating was stopped and the graphite material powder was taken out of the calcination oven after natural cooling. The graphite material powder was ground in the agate mortar, whereby a final powder of the graphite material was obtained. In this way, the graphite material was prepared in Example 6.

Preparation of Negative Electrode

A negative electrode was prepared in Example 6 by the same method as that used in Example 1 except that the graphite material prepared in Example 6 was used.

Preparation of Test Electrode

A test electrode was prepared in Example 6 by the same method as that used in Example 1 except that the negative electrode prepared in Example 6 was used.

Preparation of Evaluation Cell

A evaluation cell was prepared in Example 6 by the same method as that used in Example 1 except that the test electrode prepared in Example 6 was used.

Example 7

Preparation of Graphite Material

To a graphite powder with an average particle size of 20 μm, 43.6% of calcium boride and 53.3% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,800° C. for 50 hours. Thereafter, heating was stopped and a graphite material was taken out of the calcination oven after natural cooling. The obtained graphite material was ground in the agate mortar, whereby powder was obtained. In this way, the graphite material was prepared in Example 1.

Preparation of Negative Electrode

A negative electrode was prepared in Example 7 by the same method as that used in Example 1 except that the graphite material prepared in Example 7 was used.

Preparation of Test Electrode

A test electrode was prepared in Example 7 by the same method as that used in Example 1 except that the negative electrode prepared in Example 7 was used.

Preparation of Evaluation Cell

A evaluation cell was prepared in Example 7 by the same method as that used in Example 1 except that the test electrode prepared in Example 7 was used.

Example 8

Preparation of Graphite Material

To a graphite powder with an average particle size of 20 μm, 43.6% of calcium boride and 53.3% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,500° C. for 50 hours. Thereafter, heating was stopped and a graphite material was taken out of the calcination oven after natural cooling. The graphite material was ground in the agate mortar, whereby a powder of the graphite material was obtained. Furthermore, in the calcination oven (an Ar flow rate of 1 L/min) under the argon atmosphere, the obtained graphite material powder was heated from room temperature to 1,500° C. at a rate of 5° C. per minute and was held at 1,500° C. for 5 hours. Thereafter, heating was stopped and the graphite material powder was taken out of the calcination oven after natural cooling. The graphite material powder was ground in the agate mortar, whereby a final powder of the graphite material was obtained. In this way, the graphite material was prepared in Example 8.

Preparation of Negative Electrode

A negative electrode was prepared in Example 8 by the same method as that used in Example 1 except that the graphite material prepared in Example 8 was used.

Preparation of Test Electrode

A test electrode was prepared in Example 8 by the same method as that used in Example 1 except that the negative electrode prepared in Example 8 was used.

Preparation of Evaluation Cell

A evaluation cell was prepared in Example 8 by the same method as that used in Example 1 except that the test electrode prepared in Example 8 was used.

Comparative Example 1

Preparation of Negative Electrode

A graphite powder with an average particle size of 20 μm and polyvinylidene fluoride serving as a binder were weighed so as to give a mass ratio of 9:1 and were mixed well using an agate mortar. The mixture was dispersed in an NMP solvent, whereby slurry was prepared. The prepared slurry was applied to a Cu current collector using a coater, followed by drying, whereby a negative electrode was prepared in Comparative Example 1.

Preparation of Test Electrode

A test electrode was prepared in Comparative Example 1 by the same method as that used in Example 1 except that the negative electrode prepared in Comparative Example 1 was used.

Preparation of Evaluation Cell

A evaluation cell was prepared in Comparative Example 1 by the same method as that used in Example 1 except that the test electrode prepared in Comparative Example 1 was used.

Comparative Example 2

Preparation of Graphite Material

To a graphite powder with an average particle size of 20 μm, 27.8% of boron on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,800° C. at a rate of 5° C. per minute and was held at 1,800° C. for 5 hours. Thereafter, heating was stopped and a graphite material was taken out of the calcination oven after natural cooling. The graphite material was ground in the agate mortar, whereby powder was obtained. In this way, the graphite material was prepared in Comparative Example 2.

Preparation of Negative Electrode

The graphite material prepared in Comparative Example 2 and polyvinylidene fluoride serving as a binder were weighed so as to give a mass ratio of 9:1 and were mixed well using an agate mortar. The mixture was dispersed in an NMP solvent, whereby slurry was prepared. The prepared slurry was applied to a Cu current collector using a coater, followed by drying, whereby a negative electrode was prepared in Comparative Example 2.

Preparation of Test Electrode

A test electrode was prepared in Comparative Example 2 by the same method as that used in Example 1 except that the negative electrode prepared in Comparative Example 2 was used.

Preparation of Evaluation Cell

A evaluation cell was prepared in Comparative Example 2 by the same method as that used in Example 1 except that the test electrode prepared in Comparative Example 2 was used.

Comparative Example 3

Preparation of Graphite Material

To a graphite powder with an average particle size of 20 μm, 62.4% of calcium boride and 91.5% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,500° C. at a rate of 5° C. per minute and was held at 1,500° C. for 5 hours. Thereafter, heating was stopped and a graphite material was taken out of the calcination oven after natural cooling. The graphite material, which was obtained by calcination as described above, was ground in the agate mortar, whereby powder was obtained. In this way, the graphite material was prepared in Comparative Example 3.

Preparation of Negative Electrode

A negative electrode was prepared in Comparative Example 3 by the same method as that used in Example 1 except that the graphite material prepared in Comparative Example 3 was used.

Preparation of Test Electrode

A test electrode was prepared in Comparative Example 3 by the same method as that used in Example 1 except that the negative electrode prepared in Comparative Example 3 was used.

Preparation of Evaluation Cell

A evaluation cell was prepared in Comparative Example 3 by the same method as that used in Example 1 except that the test electrode prepared in Comparative Example 3 was used.

Comparative Example 4

Preparation of Graphite Material

To a graphite powder with an average particle size of 20 μm, 109.2% of calcium boride and 133.4% of calcium carbide on a mass basis were added, followed by grinding and mixing using an agate mortar, whereby a mixture was obtained. In a calcination oven (an Ar flow rate of 1 L/min) under an Ar atmosphere, the mixture was heated from room temperature to 1,400° C. at a rate of 5° C. per minute and was held at 1,400° C. for 5 hours. Thereafter, heating was stopped and a graphite material was taken out of the calcination oven after natural cooling. The obtained graphite material was ground in the agate mortar, whereby powder was obtained. In this way, the graphite material was prepared in Comparative Example 4.

Preparation of Negative Electrode

A negative electrode was prepared in Comparative Example 4 by the same method as that used in Example 1 except that the graphite material prepared in Comparative Example 4 was used.

Preparation of Test Electrode

A test electrode was prepared in Comparative Example 4 by the same method as that used in Example 1 except that the negative electrode prepared in Comparative Example 4 was used.

Preparation of Evaluation Cell

A evaluation cell was prepared in Comparative Example 4 by the same method as that used in Example 1 except that the test electrode prepared in Comparative Example 4 was used.

Comparative Example 5

Preparation of Graphite Material

A graphite material was prepared by a preparation method described in Example 8 of Japanese Unexamined Patent Application Publication No. 2002-110160. That is, flaky synthetic graphite, a boron powder, and calcium which were raw materials were weighed so as to give an atomic ratio of 2:2:1 and so as to amount to 1 g and were then sealed in a niobium ampoule under an Ar atmosphere. The niobium ampoule was heated at 1,000° C. for 10 hours in a muffle furnace, whereby the graphite material was prepared in Comparative Example 5.

Preparation of Negative Electrode

A negative electrode was prepared in Comparative Example 5 by the same method as that used in Example 1 except that the graphite material prepared in Comparative Example 5 was used.

Preparation of Test Electrode

A test electrode was prepared in Comparative Example 5 by the same method as that used in Example 1 except that the negative electrode prepared in Comparative Example 5 was used.

Preparation of Evaluation Cell

A evaluation cell was prepared in Comparative Example 5 by the same method as that used in Example 1 except that the test electrode prepared in Comparative Example 5 was used.

Comparative Example 6

Preparation of Graphite Material

A graphite material was prepared by a preparation method described in Example 1 of Japanese Unexamined Patent Application Publication No. 2002-110160. That is, flaky synthetic graphite, a boron powder, and metallic lithium foil which were raw materials were weighed so as to give an atomic ratio of 1:1:3 and so as to amount to 1 g and were then sealed in a niobium ampoule under an Ar atmosphere. The niobium ampoule was heated at 600° C. for 10 hours in a muffle furnace, whereby the graphite material was prepared in Comparative Example 6.

Preparation of Negative Electrode

A negative electrode was prepared in Comparative Example 6 by the same method as that used in Example 1 except that the graphite material prepared in Comparative Example 6 was used.

Preparation of Test Electrode

A test electrode was prepared in Comparative Example 6 by the same method as that used in Example 1 except that the negative electrode prepared in Comparative Example 6 was used.

Preparation of Evaluation Cell

A evaluation cell was prepared in Comparative Example 6 by the same method as that used in Example 1 except that the test electrode prepared in Comparative Example 6 was used.

Comparative Example 7

Preparation of Graphite Material

A graphite material was prepared by a preparation method described in Example 2 of Japanese Unexamined Patent Application Publication No. 2002-110160. That is, flaky synthetic graphite, a boron powder, and a metallic magnesium powder which were raw materials were weighed so as to give an atomic ratio of 1:1:3 and so as to amount to 1 g and were then sealed in a niobium ampoule under an Ar atmosphere. The niobium ampoule was heated at 900° C. for 10 hours in a muffle furnace, whereby the graphite material was prepared in Comparative Example 7.

Preparation of Negative Electrode

A negative electrode was prepared in Comparative Example 7 by the same method as that used in Example 1 except that the graphite material prepared in Comparative Example 7 was used.

Preparation of Test Electrode

A test electrode was prepared in Comparative Example 7 by the same method as that used in Example 1 except that the negative electrode prepared in Comparative Example 7 was used.

Preparation of Evaluation Cell

A evaluation cell was prepared in Comparative Example 7 by the same method as that used in Example 1 except that the test electrode prepared in Comparative Example 7 was used.

For Examples 1 to 8 and Comparative Examples 1 to 7, the analysis of a graphite material and the evaluation of an evaluation cell are described below.

Analysis of Graphite Materials

The graphite materials prepared in Examples 1 to 8 and Comparative Examples 2 to 7 were measured for boron and metal element (calcium, lithium, or magnesium) contents using an inductively coupled plasma (ICP) emission spectrometer, CIROS-120, available from Spectro.

Charge-Discharge Test

The evaluation cells prepared in Examples 1 to 8 and Comparative Examples 1 to 7 were subjected to a charge-discharge test, whereby charge/discharge characteristics thereof were evaluated. The charge-discharge test of each evaluation cell was performed in a 25° C. thermostatic chamber. In the charge-discharge test, each test electrode was charged and was then discharged after an interval of 20 minutes. The discharge capacity (charge/discharge characteristic) was evaluated by a method below.

The test electrode was charged with a constant current of 1.25 mA per unit area, 1 $cm^2$, of the test electrode until the potential difference between the test electrode and a reference electrode reached 0 V. Thereafter, the test electrode was discharged with a constant current of 5 mA per unit area, 1 $cm^2$, of the test electrode until the potential difference between the test electrode and the reference electrode reached 2 V, followed by an interval of 20 minutes. Results (discharge capacity) of the charge-discharge test of the evaluation cells prepared in Examples 1 to 8 and Comparative Examples 1 to 7 are shown in the table. The composition of the graphite materials, which are contained in negative electrodes that are the test electrode as negative electrode active materials, is also shown in the table. The composition of each graphite material shown in the table is one determined on the basis of the metal element content (calcium, lithium, or magnesium content), boron content, and carbon content of the graphite material and agrees with the expression "$Ca_xB_yC_{1-y}$". The metal element content and boron content of the graphite material were determined by ICP analysis. The carbon content was determined by subtracting the metal element content and the boron content from 100%.

TABLE

| | Composition of graphite material in negative electrode active material | Discharge capacity (mAh/g) |
|---|---|---|
| Example 1 | $Ca_{0.084}B_{0.20}C_{0.80}$ | 476 |
| Example 2 | $Ca_{0.016}B_{0.13}C_{0.87}$ | 412 |
| Example 3 | $Ca_{0.014}B_{0.11}C_{0.89}$ | 390 |
| Example 4 | $Ca_{0.005}B_{0.15}C_{0.85}$ | 421 |
| Example 5 | $Ca_{0.001}B_{0.06}C_{0.94}$ | 436 |
| Example 6 | $Ca_{0.012}B_{0.23}C_{0.77}$ | 404 |
| Example 7 | $Ca_{0.068}B_{0.19}C_{0.81}$ | 415 |
| Example 8 | $Ca_{0.008}B_{0.20}C_{0.80}$ | 399 |
| Comparative Example 1 | C (Graphite) | 343 |
| Comparative Example 2 | $B_{0.14}C_{0.86}$ | 240 |
| Comparative Example 3 | $Ca_{0.12}B_{0.23}C_{0.77}$ | 291 |
| Comparative Example 4 | $Ca_{0.17}B_{0.32}C_{0.68}$ | 191 |
| Comparative Example 5 | $Ca_{0.21}B_{0.44}C_{0.56}$ | 124 |
| Comparative Example 6 | $Li_{0.49}B_{0.46}C_{0.54}$ | 40 |
| Comparative Example 7 | $Mg_{0.24}B_{0.46}C_{0.54}$ | 77 |

Consideration

Examples 1 to 8, in which the graphite material contained in each negative electrode as a negative electrode active material satisfies the inequalities $0<x<0.2$ and $2x\leq y\leq 0.5$ in the formula $Ca_xB_yC_{1-y}$, exhibited discharge capacity higher than that of Comparative Examples 1 to 7.

As is clear from the result shown in the table, the discharge capacity is increased only in the case of using a graphite material in which appropriate amounts of calcium and boron are present in the form of solid solutions. This is probably because in order to increase the discharge capacity, though heavily doping with boron by cation addition is necessary as described above, it is necessary to have a large number of empty cation sites contributing to charge and discharge, that is, low cation concentration is necessary.

A negative electrode active material according to the present disclosure can be used as a negative electrode active material for lithium secondary batteries and the like.

What is claimed is:

1. A negative electrode active material containing a graphite material represented by a formula $Ca_xB_yC_{1-y}$, where x and y satisfy $0<x<0.2$ and $2x\leq y\leq 0.5$, and the graphite material includes a plurality of layers each containing carbon and boron, and calium loated between the plurality of layers.

2. The negative electrode active material according to claim 1, wherein x satisfies $0.001\leq x\leq 0.084$.

3. The negative electrode active material according to claim 2, wherein x and y satisfy $2x\leq y\leq 0.23$.

4. A battery comprising:
   a negative electrode containing the negative electrode active material according to claim 1;
   a positive electrode; and
   an electrolyte.

* * * * *